United States Patent
Mitsumoto et al.

(10) Patent No.: US 10,074,039 B2
(45) Date of Patent: Sep. 11, 2018

(54) IMAGE PROCESSING APPARATUS, METHOD OF CONTROLLING THE SAME, AND NON-TRANSITORY COMPUTER-READABLE STORAGE MEDIUM THAT EXTRACT PERSON GROUPS TO WHICH A PERSON BELONGS BASED ON A CORRELATION

(71) Applicant: CANON KABUSHIKI KAISHA, Tokyo (JP)

(72) Inventors: Shinichi Mitsumoto, Saitama (JP); Alex Penev, Eastlakes (AU)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 15/219,326

(22) Filed: Jul. 26, 2016

(65) Prior Publication Data

US 2017/0039453 A1 Feb. 9, 2017

(30) Foreign Application Priority Data

Aug. 7, 2015 (JP) ................................ 2015-157502

(51) Int. Cl.
*G06K 9/00* (2006.01)
*G06K 9/62* (2006.01)
(Continued)

(52) U.S. Cl.
CPC ..... *G06K 9/6267* (2013.01); *G06F 17/30259* (2013.01); *G06K 9/52* (2013.01); *G06K 9/66* (2013.01)

(58) Field of Classification Search
CPC .......... G06K 9/6267; G06K 9/52; G06K 9/66; G06F 17/30259
See application file for complete search history.

(56) References Cited

U.S. PATENT DOCUMENTS 7,995,806 B2 8/2011 Goh et al.
8,712,168 B2 4/2014 Yamaguchi
(Continued)

FOREIGN PATENT DOCUMENTS

JP 2005-031769 A 2/2005
JP 2011/089884 A1 7/2011
(Continued)

OTHER PUBLICATIONS

Communication with Extended European Search Report dated Oct. 31, 2016, issued in corresponding European Patent Application No. 16001642.4-1952.

*Primary Examiner* — Chan Park
*Assistant Examiner* — Elisa Rice
(74) *Attorney, Agent, or Firm* — Fitzpatrick, Cella, Harper & Scinto

(57) ABSTRACT

An image processing apparatus includes a first obtaining unit to obtain a number of images in which a pair of a first person and a second person simultaneously appears, out of a plurality of images. A detection unit detects whether the pair appears in a target image group, which is one of a plurality of image groups into which the plurality of images is classified. In determining whether the pair appears in the target image group, it is determined that the pair appears in the target image group not only in a case when the target image group includes an image in which the first person and the second person simultaneously appear, but also, in a case when the target image group includes images in which the first person and the second person appear separately.

28 Claims, 20 Drawing Sheets

(51) Int. Cl.
*G06F 17/30* (2006.01)
*G06K 9/52* (2006.01)
*G06K 9/66* (2006.01)

(56) References Cited

U.S. PATENT DOCUMENTS

| | | |
|---|---|---|
| 8,774,533 B2 | 7/2014 | Wu et al. |
| 2009/0016576 A1 | 1/2009 | Goh et al. |
| 2009/0144319 A1* | 6/2009 | Panwar ............. G06F 17/30569 |
| 2010/0228558 A1* | 9/2010 | Corcoran ................ G06Q 30/02 |
| | | 705/1.1 |
| 2012/0087548 A1* | 4/2012 | Wu .................... G06K 9/00677 |
| | | 382/115 |
| 2012/0170856 A1* | 7/2012 | Yamaguchi ....... G06F 17/30268 |
| | | 382/224 |
| 2015/0032535 A1 | 1/2015 | Li et al. |
| 2016/0371536 A1* | 12/2016 | Yamaji .............. G06F 17/30247 |

FOREIGN PATENT DOCUMENTS

| | | |
|---|---|---|
| JP | 5136819 B2 | 11/2012 |
| JP | 5469181 B2 | 4/2014 |
| WO | 2014/024043 A2 | 2/2014 |

\* cited by examiner

F I G. 4

400

| | 401 | 402 | 403 | 404 | 405 | 406 |
|---|---|---|---|---|---|---|
| | IMAGE ID | PATH NAME | CAPTURING DATE/TIME | EVENT ID | PERSON ID | SCORE |
| | I_0000 | a:¥IMG_00123.JPG | 2014/4/30 18:10 | E_000 | F_001,F_002 | 0.3 |
| | I_0001 | a:¥IMG_00127.JPG | 2014/4/30 18:23 | E_000 | F_001,F_002 | 0.7 |
| | I_0002 | a:¥IMG_00131.JPG | 2014/4/30 18:44 | E_000 | F_000 | 0.5 |
| | ... | ... | ... | ... | ... | ... |
| | I_0100 | a:¥IMG_00372.JPG | 2014/5/1 14:30 | E_001 | F_000,F_003,F_005 | 0.6 |
| | I_0101 | a:¥IMG_00379.JPG | 2014/5/1 14:39 | E_001 | F_004,F_006 | 0.4 |
| | ... | ... | ... | ... | ... | ... |

F I G. 5

500

| 501 | 502 | 503 |
|---|---|---|
| GROUP ID | GROUP MEMBER | APPEARANCE EVENT ID |
| G_001 | F_000,F_001,F_002 | E_000,E_002,E_003,E_004,... |
| G_002 | F_000,F_003,F_004,F_005,F_006 | E_001,E_005,E_008,E_012,... |
| G_003 | F_000,F_007 | E_007 |
| ... | ... | ... |

FIG. 6

| ARRANGEMENT ID | COORDINATES |
|---|---|
| L_00 | (20,20),(280,250) |
| L_01 | (100,300),(200,350) |
| L_02 | (400,40),(500,150) |
| L_03 | (420,200),(480,250) |
| L_04 | (400,300),(500,380) |

FIG. 7

| SPREAD NUMBER | TEMPLATE ID | IMAGE ID OF L_00 | IMAGE ID OF L_01 | IMAGE ID OF L_02 | IMAGE ID OF L_03 | IMAGE ID OF L_04 |
|---|---|---|---|---|---|---|
| S_001 | T_001 | I_0039 | I_0057 | I_0024 | I_0082 | I_0073 |
| S_002 | T_005 | I_0245 | I_0213 | I_0271 | I_0269 | I_0258 |
| S_003 | T_003 | I_0432 | I_0421 | I_0473 | I_0452 | I_0448 |
| ... | | ... | ... | ... | ... | ... |

F I G. 8
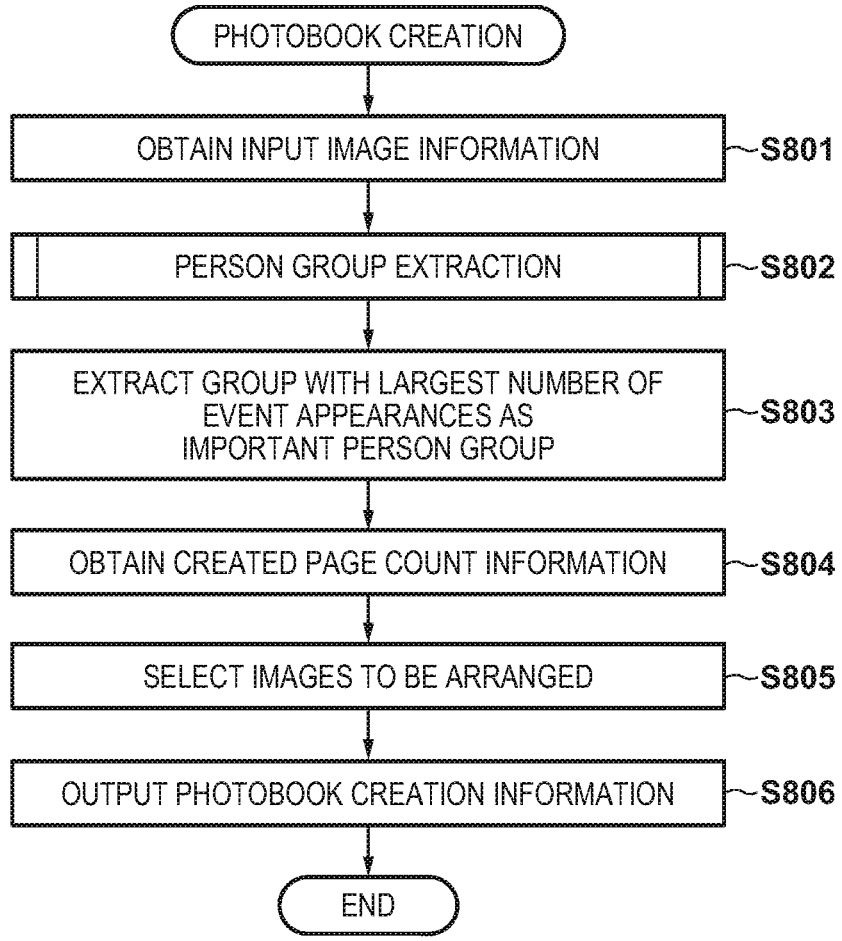

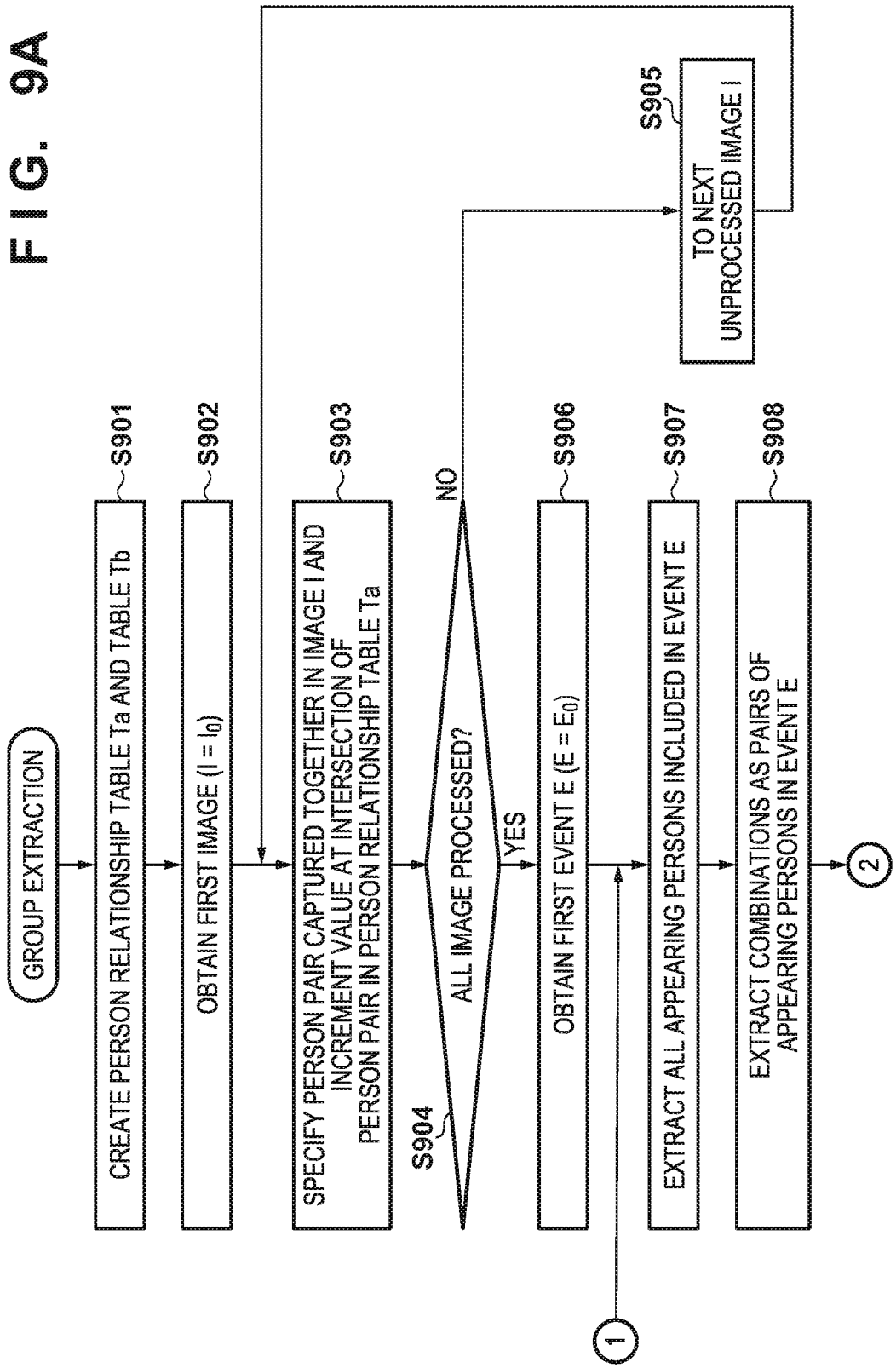

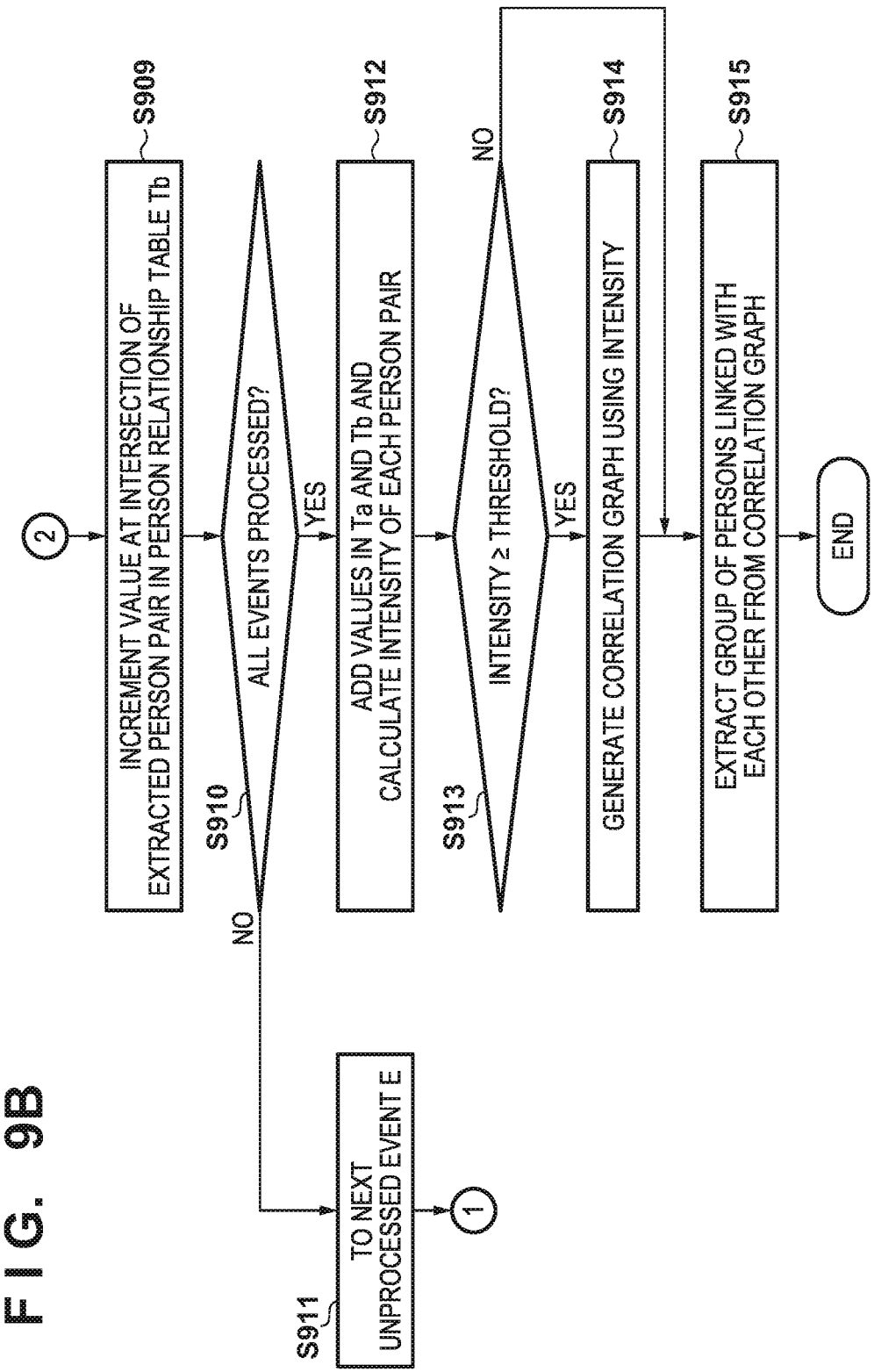

FIG. 10A

| PERSON ID | F_000 | F_001 | F_002 | F_003 | F_004 | F_005 | F_006 | F_007 | ~1001 |
|---|---|---|---|---|---|---|---|---|---|
| F_000 | – | 20 | 8 | 12 | 16 | 14 | 0 | 12 | |
| F_001 | – | – | 46 | 0 | 0 | 0 | 0 | 2 | |
| F_002 | – | – | – | 0 | 0 | 0 | 0 | 2 | |
| F_003 | – | – | – | – | 12 | 14 | 18 | 0 | |
| F_004 | – | – | – | – | – | 18 | 0 | 0 | |
| F_005 | – | – | – | – | – | – | 20 | 0 | |
| F_006 | – | – | – | – | – | – | – | 0 | |
| F_007 | – | – | – | – | – | – | – | – | |

FIG. 10B

| PERSON ID | F_000 | F_001 | F_002 | F_003 | F_004 | F_005 | F_006 | F_007 | ~1002 |
|---|---|---|---|---|---|---|---|---|---|
| F_000 | – | 13 | 13 | 6 | 6 | 6 | 6 | 3 | |
| F_001 | – | – | 13 | 0 | 0 | 0 | 0 | 1 | |
| F_002 | – | – | – | 0 | 0 | 0 | 0 | 1 | |
| F_003 | – | – | – | – | 6 | 6 | 6 | 6 | |
| F_004 | – | – | – | – | – | 6 | 6 | 6 | |
| F_005 | – | – | – | – | – | – | 6 | 6 | |
| F_006 | – | – | – | – | – | – | – | 0 | |
| F_007 | – | – | – | – | – | – | – | – | |

FIG. 10C

| PERSON ID | F_000 | F_001 | F_002 | F_003 | F_004 | F_005 | F_006 | F_007 | ~1003 |
|---|---|---|---|---|---|---|---|---|---|
| F_000 | – | 33 | 21 | 18 | 22 | 20 | 6 | 15 | |
| F_001 | – | – | 59 | 0 | 0 | 0 | 0 | 3 | |
| F_002 | – | – | – | 0 | 0 | 0 | 0 | 3 | |
| F_003 | – | – | – | – | 18 | 20 | 24 | 0 | |
| F_004 | – | – | – | – | – | 24 | 6 | 0 | |
| F_005 | – | – | – | – | – | – | 26 | 0 | |
| F_006 | – | – | – | – | – | – | – | 0 | |
| F_007 | – | – | – | – | – | – | – | – | |

FIG. 11

| EVENT ID | APPEARING PERSON ID |
|---|---|
| E_000 | F_000,F_001,F_002 |
| E_001 | F_000,F_003,F_004,F_005,F_006 |
| E_002 | F_000,F_001,F_002 |
| E_003 | F_000,F_001,F_002 |
| E_004 | F_000,F_001,F_002 |
| E_005 | F_000,F_003,F_004,F_005,F_006 |
| ... | ... |

| |
|---|
| F_000 AND F_001 |
| F_000 AND F_002 |
| F_001 AND F_002 |

| |
|---|
| F_000 AND F_003 |
| F_000 AND F_004 |
| F_000 AND F_005 |
| F_000 AND F_006 |
| F_003 AND F_004 |
| F_003 AND F_005 |
| F_003 AND F_006 |
| F_004 AND F_005 |
| F_004 AND F_006 |
| F_005 AND F_006 |

| PERSON ID | IMPORTANCE |
|---|---|
| F_000 | 0.9 |
| F_001 | 0.9 |
| F_002 | 0.9 |
| F_003 | 0.3 |
| F_004 | 0.2 |
| F_005 | 0.4 |
| F_006 | 0.2 |
| F_007 | 0.1 |
| ... | ... |

| PERSON ID | F_000 | F_001 | F_002 | F_003 | F_004 | F_005 | F_006 | F_007 |
|---|---|---|---|---|---|---|---|---|
| F_000 | – | 0.559 | 0.356 | 0.305 | 0.373 | 0.339 | 0.102 | 0.254 |
| F_001 | – | – | 1.000 | 0 | 0 | 0 | 0 | 0.051 |
| F_002 | – | – | – | 0 | 0 | 0 | 0 | 0.051 |
| F_003 | – | – | – | – | 0.305 | 0.339 | 0.407 | 0 |
| F_004 | – | – | – | – | – | 0.407 | 0.021 | 0 |
| F_005 | – | – | – | – | – | – | 0.441 | 0 |
| F_006 | – | – | – | – | – | – | – | 0 |
| F_007 | – | – | – | – | – | – | – | – |

| GROUP ID 501 | GROUP MEMBER 502 | APPEARANCE EVENT ID 503 | SCORE 1801 | IMPORTANCE 1802 |
|---|---|---|---|---|
| G_001 | F_000,F_001,F_002 | E_000,E_002,E_003,E_004,... | 0.517 | 1 |
| G_002 | F_000,F_003,F_004,F_005,F_006 | E_001,E_005,E_008,E_012,... | 0.087 | 0 |
| G_003 | F_000,F_007 | E_007 | 0.011 | 0 |
| ... | ... | ... | ... | ... |

1800

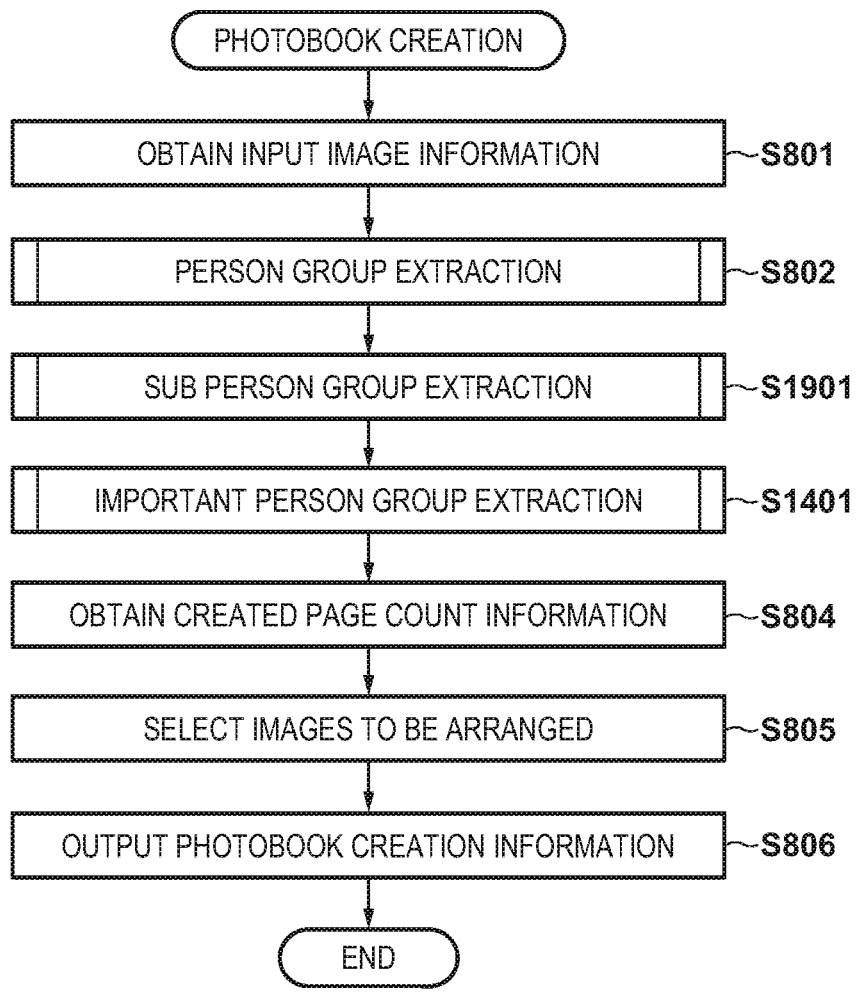

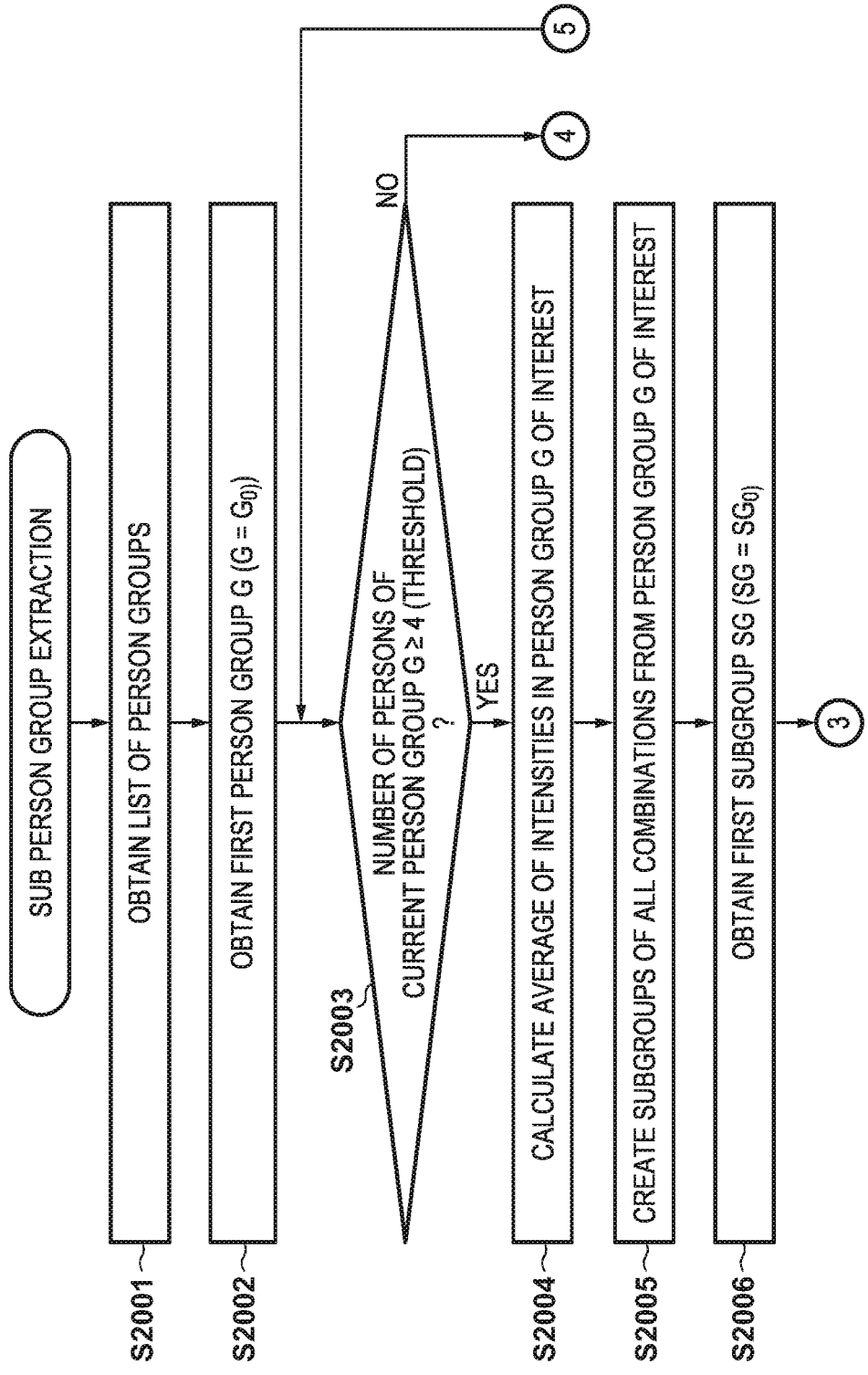

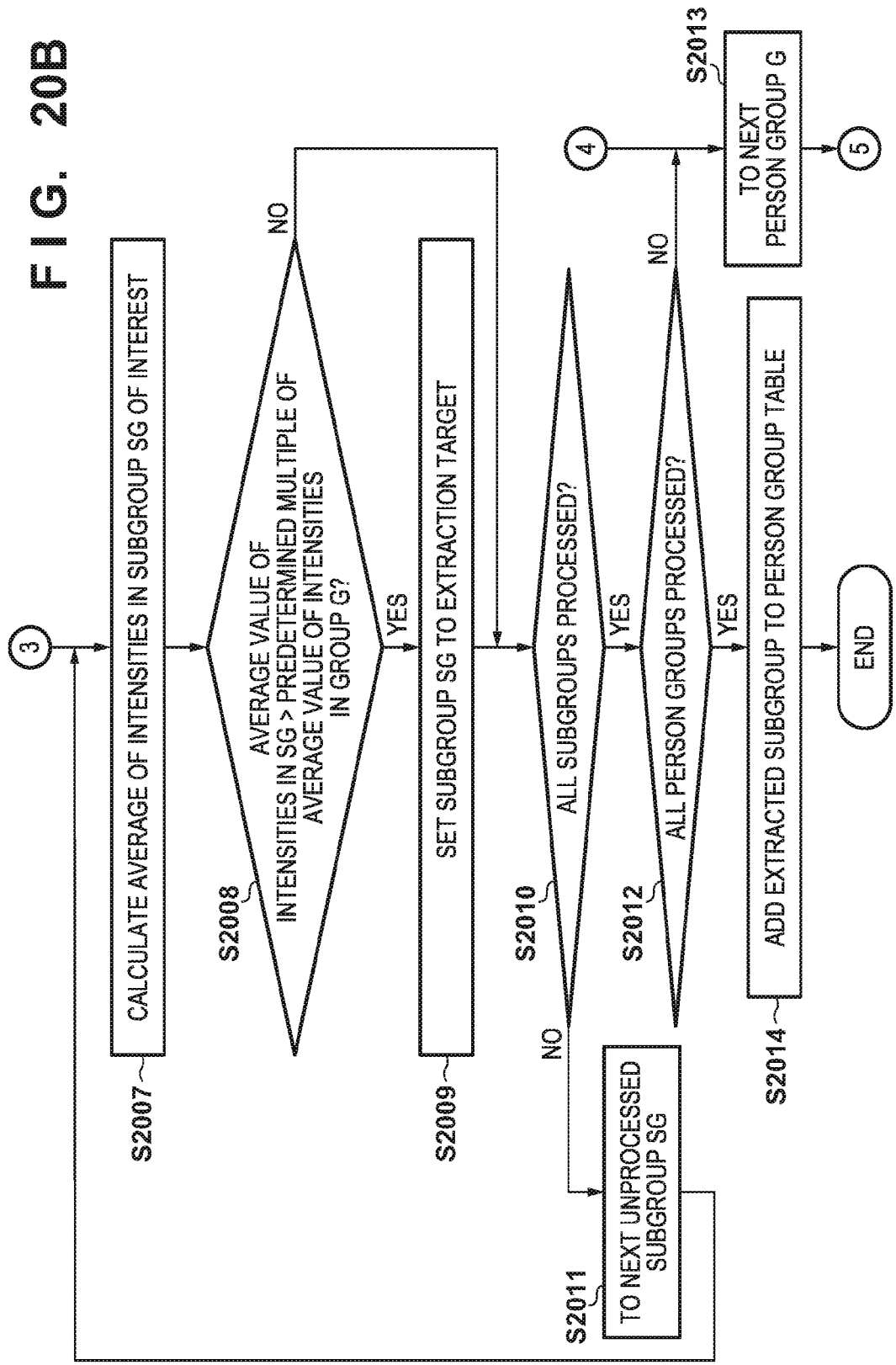

FIG. 21A

| GROUP ID | GROUP MEMBER | AVERAGE OF INTENSITIES |
|---|---|---|
| G_031 | F_100,F_101,F_110,F_111,F_120,F_121 | 34.7 |

FIG. 21B

| PERSON ID | F_101 | F_110 | F_111 | F_120 | F_121 |
|---|---|---|---|---|---|
| F_100 | 70 | 50 | 48 | 24 | 26 |
| F_101 | – | 34 | 30 | 46 | 52 |
| F_110 | – | – | 42 | 14 | 14 |
| F_111 | – | – | – | 16 | 16 |
| F_120 | – | – | – | – | 38 |

F I G. 22

| SUBGROUP ID | GROUP MEMBER | AVERAGE OF INTENSITIES | EXTRACTION TARGET |
|---|---|---|---|
| SG_031-1 | F_100,F_101 | 70 | 1 |
| SG_031-2 | F_100,F_110 | 50 | 0 |
| ⋮ | ⋮ | ⋮ | ⋮ |
| SG_031-16 | F_100,F_101,F_110 | 51.3 | 0 |
| SG_031-17 | F_100,F_101,F_111 | 49.3 | 0 |
| ⋮ | ⋮ | ⋮ | ⋮ |
| SG_031-35 | F_111,F_120,F_121 | 23.3 | 0 |
| SG_031-36 | F_100,F_101,F_110,F_111 | 45.7 | 0 |
| ⋮ | ⋮ | ⋮ | ⋮ |
| SG_031-51 | F_100,F_101,F_110,F_111,F_120 | 37.4 | 0 |
| ⋮ | ⋮ | ⋮ | ⋮ |
| SG_031-56 | F_101,F_110,F_111,F_120,F_121 | 30.2 | 0 |

IMAGE PROCESSING APPARATUS, METHOD OF CONTROLLING THE SAME, AND NON-TRANSITORY COMPUTER-READABLE STORAGE MEDIUM THAT EXTRACT PERSON GROUPS TO WHICH A PERSON BELONGS BASED ON A CORRELATION

CLAIM OF PRIORITY

This application claims the benefit of Japanese Patent Application No. 2015-157502, filed Aug. 7, 2015, which is hereby incorporated by reference herein in its entirety.

BACKGROUND OF THE INVENTION

Field of the Invention

The present invention relates to an image processing apparatus, a method of controlling the same, and a non-transitory computer-readable storage medium.

Description of the Related Art

In recent years, digital cameras have become popular, and storage media have implemented an increase in capacity and cost reduction. This increases opportunities of capturing an image and the amount of saved images. A service has started in which images in a predetermined range are designated out of held images, and images are automatically selected to create a photobook or a movie. For example, pages are assigned for each event such as travel, a wedding, or a birthday party. The relationship of persons captured in images included in the event is analyzed, and images are selected using the relationship of persons.

Japanese Patent No. 5136819 discloses a method of creating a person correlation graph using the number of times persons are captured together in the same image, and finding a group of persons linked with each other using the created graph. Japanese Patent No. 5469181 discloses a method of determining a group to which a person belongs, such that a person is determined to be a family member if he/she belongs to a plurality of image sets, or to be a friend if he/she appears a plurality of times in an image set, and remaining persons are determined to be other people.

However, when the number of images in which persons are captured together is used, as in Japanese Patent No. 5136819, persons who attend the same event are not put in the same group, unless an image in which they are captured together exists. In addition, if a passerby happens to be captured, he/she may be determined to belong to the same person group. On the other hand, when the attribute of a group is determined based on the number of times a person appears in a plurality of image sets, as in Japanese Patent No. 5469181, for example, a friend who appears in a plurality of image sets may be determined to belong to the group of a family. Additionally, even a friend of another acquaintance, such as a friend in the company, or in the school days may be determined to belong to the same friend group.

SUMMARY OF THE INVENTION

The present invention has been made in consideration of the above-described problem, and more correctly extracts a person group.

According to one aspect, the present invention provides an image processing apparatus comprising a first obtaining unit configured to obtain the number of images in which a first person and a second person simultaneously appear out of a plurality of images, a second obtaining unit configured to obtain the number of image groups in which the first person and the second person appear out of a plurality of image groups into which the plurality of images are classified, a specifying unit configured to specify an intensity of a relationship between the first person and the second person based on the number of images obtained by the first obtaining unit and the number of image groups obtained by the second obtaining unit, a generation unit configured to generate information of a correlation of a plurality of persons who appear in the plurality of images, based on the intensity specified by the specifying unit, and an extraction unit configured to extract one or a plurality of person groups to which each of the plurality of persons belongs, based on the information of the correlation of the persons generated by the generation unit.

According to another aspect, the present invention provides a method of controlling an image processing apparatus, comprising obtaining the number of images in which a first person and a second person simultaneously appear out of a plurality of images, obtaining the number of image groups in which the first person and the second person appear out of a plurality of image groups into which the plurality of images are classified, specifying an intensity of a relationship between the first person and the second person based on the number of images obtained in the obtaining the number of persons and the number of image groups obtained in the obtaining the number of image groups, generating information of a correlation of a plurality of persons who appear in the plurality of images, based on the intensity specified in the specifying, and extracting one or a plurality of person groups to which each of the plurality of persons belongs, based on the information of the correlation of the persons generated in the generating.

According to another aspect, the present invention provides a non-transitory computer-readable storage medium storing a program that causes a computer to function as a first obtaining unit configured to obtain the number of images in which a first person and a second person simultaneously appear out of a plurality of images, a second obtaining unit configured to obtain the number of image groups in which the first person and the second person appear out of a plurality of image groups into which the plurality of images are classified, a specifying unit configured to specify an intensity of a relationship between the first person and the second person based on the number of images obtained by the first obtaining unit and the number of image groups obtained by the second obtaining unit, a generation unit configured to generate information of a correlation of a plurality of persons who appear in the plurality of images, based on the intensity specified by the specifying unit, and an extraction unit configured to extract one or a plurality of person groups to which each of the plurality of persons belongs, based on the information of the correlation of the persons generated by the generation unit.

According to the present invention, it is possible to more correctly extract a person group for each person appearing in a plurality of images.

Further features of the present invention will become apparent from the following description of exemplary embodiments (with reference to the attached drawings).

BRIEF DESCRIPTION OF THE DRAWINGS

FIG. 4 is a view showing an example of the arrangement of an image management table according to the present invention;

FIG. 5 is a view showing an example of the arrangement of a person group table according to the present invention;

FIG. 6 is a view showing an example of a template according to the present invention;

FIG. 7 is a view showing an example of the arrangement of a photobook creation information table according to the present invention;

FIG. 8 is a flowchart of photobook creation processing according to the first embodiment;

FIGS. 9A and 9B are flowcharts of person group extraction processing according to the first embodiment;

FIGS. 10A, 10B, and 10C are views showing examples of the arrangement of a person relationship table of person pairs according to the present invention;

FIG. 11 is a view showing an example of the arrangement of an event appearing person table according to the present invention;

FIGS. 12A and 12B are views showing examples of person pair lists according to the present invention;

FIG. 16 is a view showing an example of the arrangement of a person importance table according to the second embodiment;

FIG. 17 is a view showing an example of the arrangement of a person relationship table according to the second embodiment;

FIG. 18 is a view showing an example of the arrangement of a person group table according to the second embodiment;

FIG. 19 is a flowchart of photobook creation processing according to the third embodiment;

FIGS. 20A and 20B are flowcharts of subgroup extraction processing according to the third embodiment;

FIGS. 21A and 21B are views showing examples of the arrangement of a table as an example of a person group according to the third embodiment; and FIG. 22 is a view showing an example of the arrangement of a subgroup table according to the third embodiment.

DESCRIPTION OF THE EMBODIMENTS

Preferred embodiments of the present invention will now be described in detail with reference to the accompanying drawings. Note that the arrangements to be described in the following embodiments are merely examples, and the present invention is not limited to the illustrated arrangements.

First Embodiment

In this embodiment, an image processing apparatus that extracts a person group from input images, automatically selects images to be used based on the extracted person group, and creates a photobook, will be exemplified. As a form of the image processing apparatus according to the present invention, a photobook creation application that operates on a personal computer (PC) will be exemplified.

[Apparatus Arrangement]

Figure 1:
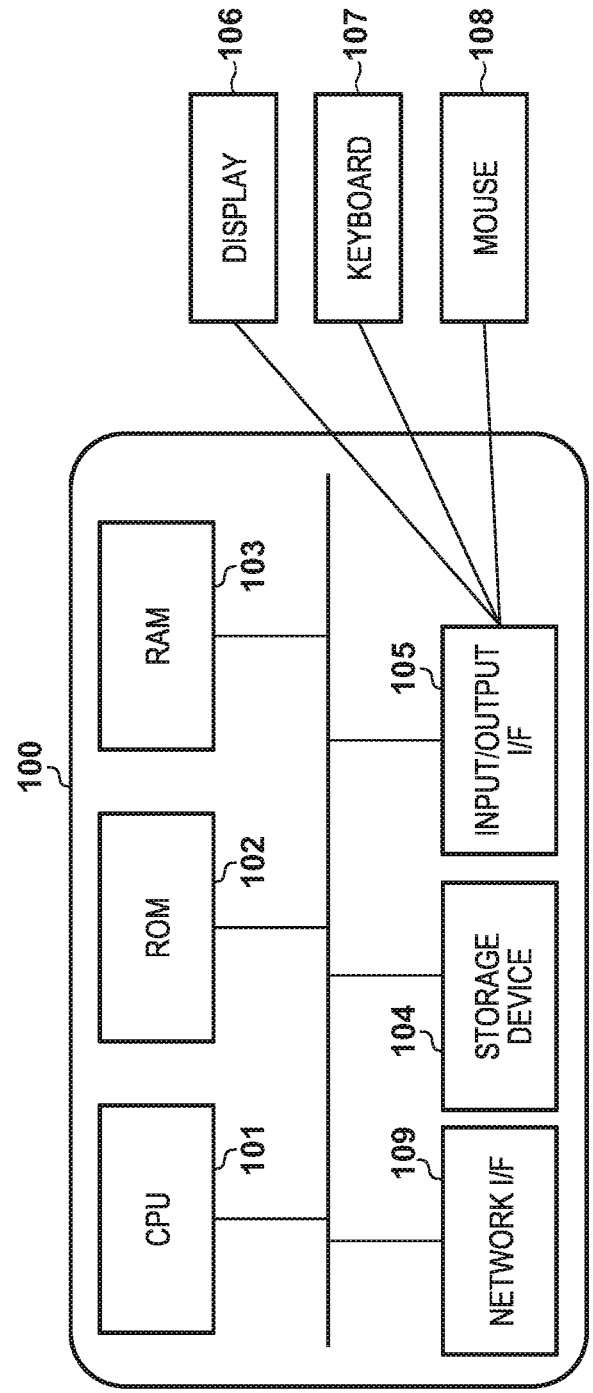
FIG. 1 is a block diagram showing an example of the hardware arrangement of an image processing apparatus according to the present invention.

FIG. 1 is a block diagram showing an example of the arrangement of an image processing apparatus 100 according to this embodiment. A CPU 101 is involved in all processes of components. The CPU 101 sequentially loads and interprets instructions (programs) stored in a ROM 102 or a RAM 103 as a storage area and executes processing in accordance with the result, thereby performing various kinds of control. A storage device 104 such as an HDD or an SSD stores a large capacity of data, and is used to store an input image or a creation result, or a program configured to execute image processing. In this embodiment, the storage device 104 stores an application program for photobook creation (to be described later).

An input/output interface (I/F) 105 is an interface necessary for connection with input/output devices, and connects a display 106, a keyboard 107, and a mouse 108. The display 106 is an output device configured to display an operation screen. The keyboard 107 and the mouse 108 are devices configured to detect an operation input by a user. A network interface 109 is an interface used to connect an external device via a network.

Note that the hardware arrangement of the apparatus is not limited to that described above. For example, the display 106 may be a device including a touch sensor to detect an input. Similar to a cloud service, processing may be performed in a server existing on an external network, and input/output operations may be performed on a device at hand. In this embodiment, the storage destination of a material (for example, an image file) is the storage device 104. However, the storage device may be located outside of the image processing apparatus 100 via the network interface 109. Examples of the external storage devices are a network storage on a LAN (not shown) and a storage service on a cloud.

[Photobook Creation Application]

Figure 2:
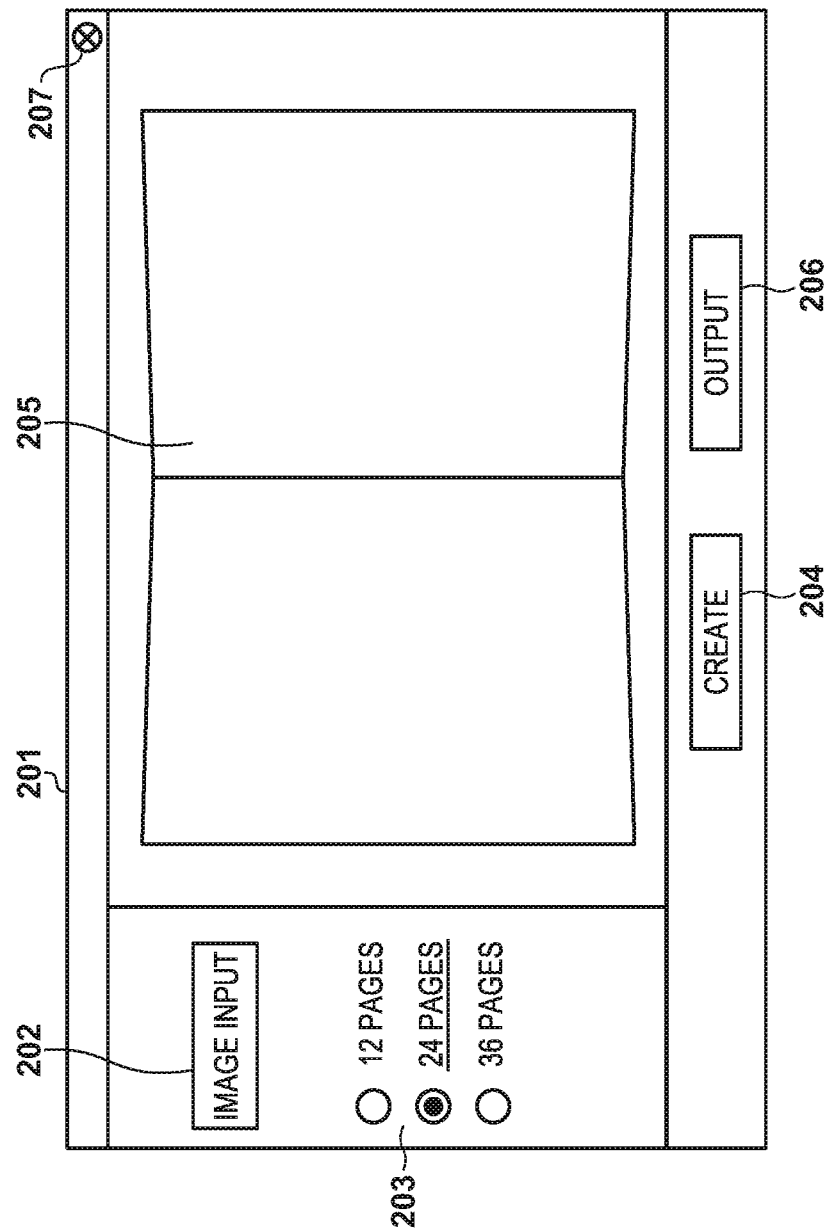
FIG. 2 is a view showing an example of the screen of a photobook creation application according to the present invention.

FIG. 2 is a view showing an example of the operation screen of a photobook creation application. In this embodiment, the photobook creation application stored in the storage device 104 is activated when, for example, the user double-clicks the icon of the application displayed on the display 106. More specifically, the program of the photobook creation application stored in the storage device 104 is loaded to the RAM 103. When the program in the RAM 103 is executed by the CPU 101, the album creation application is activated to display the operation screen shown in FIG. 2.

An operation screen 201 includes an image input button 202, a page count selection button 203, a creation button 204, a preview region 205, an output button 206, and an end button 207. When the image input button 202 is pressed, an image selection screen (not shown) is displayed. By selecting an image as the target of photobook creation, the image (image data) can be input. The selection target includes not only image files, but also, folders storing image files. The page count selection button 203 is used to select the total number of pages of a photobook to be created. The user can select one of a plurality of page count candidates that are defined in advance. Processing of disabling selection before image input or processing of disabling selection of the page count if the number of input images is low may be performed. In addition, a screen that prompts the user to additionally input an image may be displayed.

The creation button 204 is a button that starts creating a photobook using the number of input images and the page count selected by the page count selection button 203 as conditions. The preview region 205 is a region to display the created photobook. Note that the display changes depending on user selection on the page count selection button 203. When the output button 206 is pressed, a photobook creation information table that describes the condition of the photobook is output to an arbitrary place. Details of the photobook creation information table will be described later. The end button 207 is a button used to end the photobook creation application.

Figure 3:
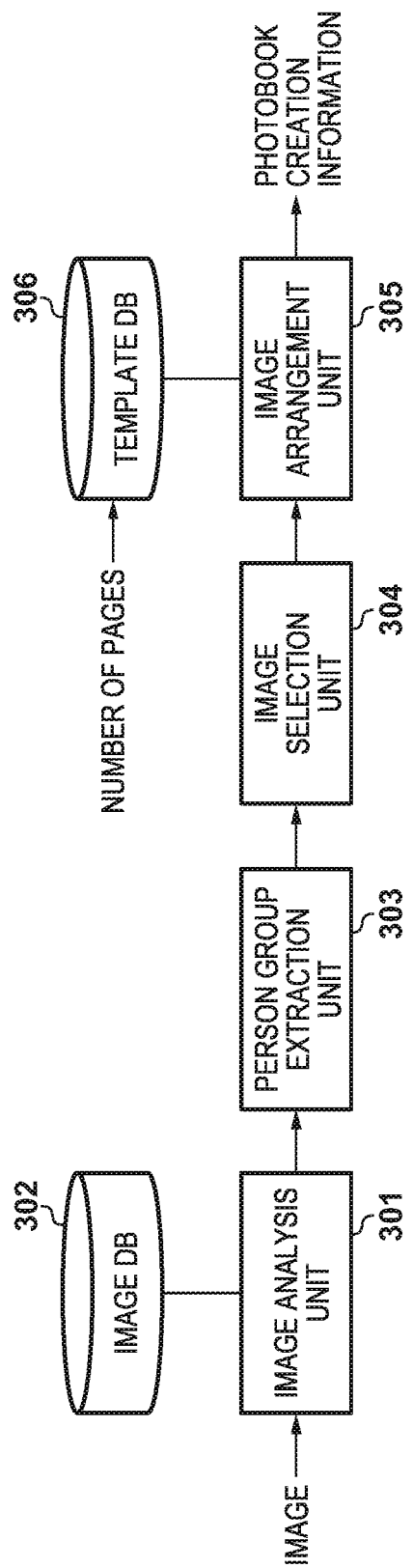
FIG. 3 is a block diagram showing an example of the arrangement of an album creation application according to the present invention.

FIG. 3 is a block diagram showing an example of the arrangement of the photobook creation application. Processing units 301 and 303 to 305 (to be described later) are executed by the CPU 101 of the image processing apparatus 100. DBs 302 and 306 are stored in the storage device 104. The image analysis unit 301 analyzes input image data, and stores the analysis result in the image DB 302 as an image management table 400 exemplarily shown in FIG. 4.

The image management table 400 shown in FIG. 4 includes an image ID 401 for identifying an image, a path name 402 representing an image storage location, a capturing date/time 403, an event ID 404 for identifying an event, a person ID 405 for identifying a person, and a score 406 representing image quality as a point. As for events, images are divided for each event such as a birthday party or travel, to generate image groups. An ID (identification information) used to uniquely identify each event is assigned to a divided image group. As for the dividing method, the images are arranged sequentially in the order of capturing time based on the capturing time added to the image data by the image analysis unit 301, and divided if the difference between the capturing times becomes equal to or greater than a predetermined threshold (for example, four hours). Not only the capturing time, but also, position information included in the image data may be used as the capturing information, and the images may be divided if the distance between the image data becomes equal to or greater than a predetermined threshold. If the user generates a storage folder for each event and classifies images in advance, an event may be determined on a folder basis without performing division based on the time or position. Alternatively, the images may be classified based on attribute information set by the user.

As for the person ID, face recognition processing is performed, and a unique ID is assigned to each recognized person. The face recognition processing is not particularly limited, and any known method is usable if it can identify a person. Concerning point calculation processing for a score as well as a known method can be used. For example, a score may be calculated using a spatial frequency component as in a method described in Japanese Patent Laid-Open No. 2005-31769. In this embodiment, the score is calculated as a point within the range of 0 to 1. Note that, in the face recognition processing, the face of a person captured (included) in an image represented by image data is recognized.

Note that image analysis processing starts at the timing of image input to the image processing apparatus 100. If an already analyzed image is input, the analysis processing may be omitted by using existing information. If information necessary for the analysis is extracted in advance and input together with an image, the analysis processing may be omitted by using the input information.

Figure 13A:
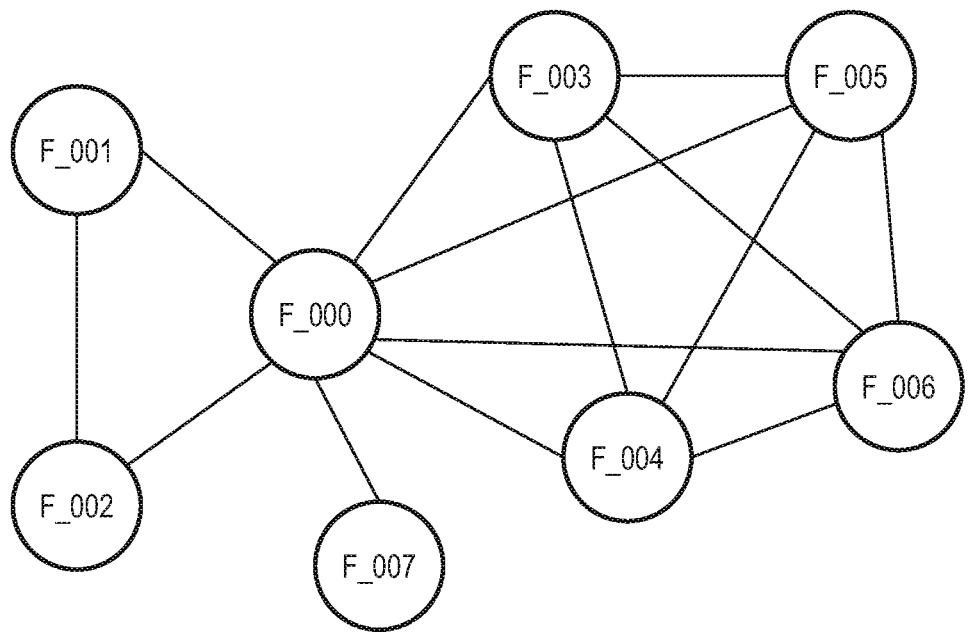
FIGS. 13A and 13B are views showing an example of a correlation graph according to the present invention.
Figure 13B:
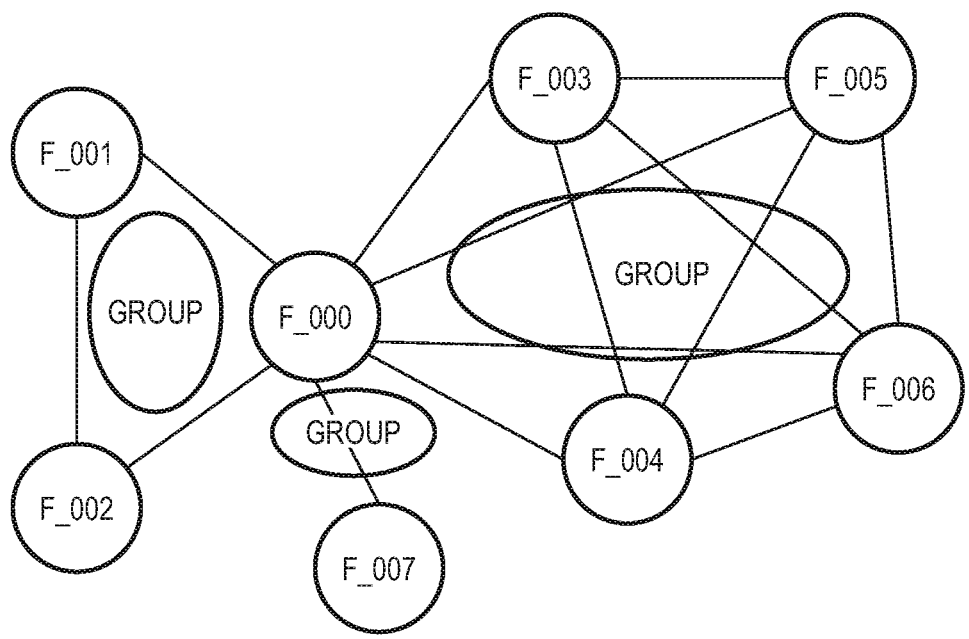

The person group extraction unit 303 extracts a group formed from persons associated with each other, as shown in FIG. 13B, from the input images. The extracted person group is managed in a person group table 500 shown in FIG. 5. The person group table 500 includes a group ID 501, a group member 502 that is the list of the members of a group, and an appearance event ID 503 that is the list of events in which the group members appear. The event ID 503 is the same as the ID assigned as the event ID 404 in FIG. 4.

The image selection unit 304 selects images based on the information of the extracted person group. The image arrangement unit 305 arranges the images on each "spread" representing a double spread based on coordinates described on a template stored in the template DB 306. In this embodiment, a number obtained by dividing the page count selected by the page count selection button 203 of the operation screen 201 shown in FIG. 2 by two is the number of spreads.

FIG. 6 shows an example of a template image arrangement table according to this embodiment. An example in which a template has five slots will be described here. A slot is a frame in which an image is arranged. A template image arrangement table 600 includes an arrangement ID 601 and coordinates 602. Coordinates on a spread are shown in correspondence with each arrangement ID. As for the coordinates 602, the coordinates of the upper left point and the coordinates of the lower right point of a display region are set for each display image based on the upper left corner of a spread, and the size and position of the display image can be designated. Each template is assigned a template ID that is used to uniquely identify the template, and stored in the template DB 306. The template image arrangement table has a plurality of coordinate patterns for each spread. Selected image data are arranged on each spread and output in a form of a photobook creation information table 700 as shown in FIG. 7.

FIG. 7 shows an example of the photobook creation information table according to this embodiment. The photobook creation information table 700 includes a spread number 701, a template ID 702, and image IDs 703 to 707 of images arranged at arrangement positions L_00 to L_04. Template IDs corresponding to the spreads and image IDs corresponding to the arrangement IDs are arranged. Note that FIGS. 6 and 7 show an example in which five images are arranged on one template. However, the present invention is not limited to this, and a template to arrange a lesser or a greater number of images may be used in consideration of the size of an image, or the like.

[Processing Procedure]

Main processing of the photobook creation application will be described with reference to the flowchart of FIG. 8. This processing procedure is implemented when the CPU 101 of the image processing apparatus 100 reads out and executes a program according to this embodiment stored in the storage device 104, or the like. The main processing starts when the user presses the creation button 204 of the operation screen 201 shown in FIG. 2.

In step S801, the image analysis unit 301 obtains, from the image DB 302, the information of each image data of an image data group input by the image input button 202. The obtained information is the information represented by the image management table 400 shown in FIG. 4. If the input image data group is not divided on an event basis, or person recognition processing is not completed, division processing and recognition processing of the image data group are performed, and the process then advances to the next step.

In step S802, the person group extraction unit 303 extracts person groups using the information of the image management table 400, and outputs the person group table 500 shown in FIG. 5. Details of the person group extraction processing will be described later with reference to the flowchart of FIGS. 9A and 9B.

In step S803, using the person group table 500, the person group extraction unit 303 extracts a person group with the greatest number of event appearances from the plurality of person groups extracted in step S802 as an important person group.

In step S804, the image selection unit 304 obtains the information of a page count selected by the page count selection button 203. In addition, the image selection unit 304 halves the obtained page count to obtain the number of spreads of the entire photobook. Using the image management table 400, the image selection unit 304 obtains the number of images of each event, and selects events as many as the number of spreads in descending order of number of images. For example, if the number of events is fifty, and the number of spreads is twelve, twelve events whose numbers of images are ranked high are selected. In this embodiment, one event is assigned to one spread. However, the present invention is not limited to this. For example, one event may be assigned to a plurality of pages, or a plurality of events may be assigned to one spread.

In step S805, the image arrangement unit 305 assigns the events extracted in step S804 to the spreads in the order of capturing time. The image arrangement unit 305 assigns a template from the template DB 306 to each spread. The image arrangement unit 305 selects images as many as the number of slots (the number of images to be arranged) described in each template. When selecting images, using the scores, the image arrangement unit 305 selects images as many as the number described in each template, in descending order of score. At this time, for example, if a person included in an image selected once is captured in another image, the point of the image may be lowered to prevent images with a specific person from being predominantly selected.

In step S806, the image arrangement unit 305 decides the arrangement of the images selected in step S805, and outputs the photobook creation information table 700 shown in FIG. 7. The processing procedure thus ends.

A photobook can be created by outputting the output photobook creation information table 700, templates, and image data to a photobook maker.

(Person Group Extraction Processing)

Person group extraction processing will be described next with reference to the flowchart of FIGS. 9A and 9B. This processing procedure corresponds to step S802 of FIG. 8.

In step S901, the person group extraction unit 303 calculates the number of appearing persons from all images as the photobook creation target using the information of the image management table 400 obtained in step S801. In addition, the person group extraction unit 303 creates person relationship tables Ta and Tb. The person relationship table represents the relationship among persons, and is formed from a calculated number of persons×a calculated number of persons in this embodiment. In the person relationship table, the person IDs of appearing persons are arranged along the ordinate and the abscissa, as shown in FIGS. 10A to 10C, and the initial value is set to zero. Here, a person relationship table 1001 shown in FIG. 10A is handled as the person relationship table $T_a$, and a person relationship table 1002 shown in FIG. 10B is handled as the person relationship table $T_b$. The person relationship table $T_a$ is a table used to count the number of person pairs simultaneously appearing in the same image. On the other hand, the person relationship table $T_b$ is a table used to count the number of person pairs appearing in the same event. That is, in the person relationship table $T_b$, two persons of a person pair are counted when they appear in the same event (same image group) even if they do not appear in the same image.

In step S902, the person group extraction unit 303 extracts image IDs from the image management table 400, and obtains the total number of images as n. In addition, the person group extraction unit 303 defines the images as $I_0, I_1, I_2, \ldots, I_{n-1}$ the order of image ID. The person group extraction unit 303 sets the first image $I_0$ as an image I of interest.

In step S903, the person group extraction unit 303 obtains a pair of persons captured together in the image I of interest, and increments the value in the cell of the intersection of the person pair by one. If three persons, A, B, and C, are captured in an image, three person pairs of the persons A and B, persons A and C, and persons B and C can be obtained. Accordingly, values in three cells are incremented by one in one image. The number of images with persons captured together in a single image is recorded in the person relationship table $T_a$ in this way.

In step S904, the person group extraction unit 303 determines whether the process of step S903 is ended for all images, that is, whether the image I of interest is $I_{n-1}$. If the process is ended for all images (YES in step S904), the process advances to step S906. On the other hand, if the process is not ended (NO in step S904), the process advances to step S905.

In step S905, the person group extraction unit 303 changes the image I of interest as the processing target to the next unprocessed image. The process returns to step S903 to repeat the processing.

In step S906, the person group extraction unit 303 extracts event IDs from the image management table 400, and obtains the total number of events as n. The events are defined as $E_0, E_1, E_2, \ldots, E_{n-1}$ in the order of event ID. The person group extraction unit 303 sets the first event $E_0$ as an event E of interest.

In step S907, the person group extraction unit 303 extracts persons appearing in the event E of interest. Concerning the extracted persons, the person IDs of the persons appearing in each event are listed as in an event appearing person table 1100 shown in FIG. 11. The event appearing person table 1100 is formed by associating an event ID 1101 and an appearing person ID 1102. Here, assume that one or a plurality of persons appear in one event.

In step S908, the person group extraction unit 303 extracts person pairs from the appearing persons obtained in step S907 for each event E. FIGS. 12A and 12B show the lists of extracted person pairs. FIG. 12A shows a list 1201 of person pairs extracted from event E_000. FIG. 12B shows a list 1202 of person pairs extracted from event E_001.

In step S909, the person group extraction unit 303 records the person pairs extracted in step S908 in the person relationship table $T_b$. If each person of an extracted person pair appears at least once in one image group corresponding to one event, the value of the person pair is incremented by one. Here, the values are incremented on an event basis. The number of events that the person pairs attended together is thus recorded in the table $T_b$.

In step S910, the person group extraction unit 303 determines whether the processes of steps S907 to S909 are ended for all events, that is, whether the event E of interest is $E_{n-1}$. If the processes are ended (YES in step S910), the process advances to step S912. On the other hand, if the processes are not ended (NO in step S910), the process advances to step S911.

In step S911, the person group extraction unit 303 changes the event E of interest as the processing target to the next unprocessed event E. The process returns to step S907 to repeat the processing.

In step S912, the person group extraction unit 303 adds the values in the person relationship table $T_a$ and the values in the person relationship table $T_b$. FIG. 10C shows a person relationship table 1003 obtained as the result of addition of the values in the person relationship tables $T_a$ and $T_b$. The sum of values is the intensity of correlation of each person pair. Note that, in this embodiment, the person relationship tables $T_a$ and $T_b$ are simply added. However, the values in the person relationship table $T_a$ and the values in the person relationship table $T_b$ may be weighted and then added.

In step S913, the person group extraction unit 303 determines whether the intensity calculated in step S912 exceeds a threshold. If the intensity exceeds the threshold (YES in step S913), the process advances to step S914. If the intensity does not exceed the threshold (NO in step S913), the process advances to step S915. The threshold is the threshold of correlation intensity. Here, the threshold is a fixed value, and "5" is used in this example. However, the present invention is not limited to this, and the user may set an arbitrary value. Alternatively, for example, the number of input images, the number of events, or the number of appearing persons is used to set a variable value as the threshold. For example, the intensities of all person pairs are extracted, the average and variance of the intensities are obtained, and a value less than the average by a predetermined amount may be set as the intensity threshold.

In step S914, the person group extraction unit 303 forms a correlation graph using the obtained intensity values. FIG. 13A shows an example of a correlation graph.

In step S915, the person group extraction unit 303 extracts a person group formed from persons linked with each other (persons associated with each other) from the correlation graph generated in step S914. FIG. 13B shows an example of extracted person groups. In the example of FIGS. 13A and 13B, three person groups are extracted. The person group extraction unit 303 adds the extracted person groups to the person group table 500. The processing procedure thus ends.

As described above, in this embodiment, when creating a photobook, a person group is extracted from an image data group. The extracted person group can be used as the standard of automatic image selection. As for the person group extraction, a person group can more correctly be extracted using the information of persons captured together in an image and the information of persons attended an event together. For example, a photographer (for example, a father in a family) may be captured in a few photographs together with other persons. However, he exists in a plurality of events and can, therefore, belong to a person group of high correlation.

When the number of persons who attend the same event is used to extract a person group, a passerby happens to be captured in a photograph at an event that friends attend together can be suppressed from being added to a person group formed from the friends as event attendees. As a result, when automatically selecting images, selection of the image of the passerby can be suppressed. On the other hand, if only the number of persons who attend the same event is used, a person who attends a barbecue together with the family of a friend of his/her child may belong to the same person group. However, if the number of images of persons captured together is used to extract a person group, the number of images of persons captured together in each family becomes large, and the correlation intensity does not exceed a predetermined threshold. This can suppress the person from belonging to the same person group.

In addition, a plurality of person groups, for example, a family group, a friend group, and a company group can be extracted in correspondence with one person. In a case in which a plurality of events are assigned to one spread (double page spread), uniformity can be imparted by assigning the same person group to the left and right pages of the spread. On the other hand, diversity can be imparted to the spread by selecting different person groups.

Note that, in this embodiment, a photobook is created using images (still images). However, video files (moving images) may be used, or still images extracted from moving images may be used. In this embodiment, an example in which a photobook is created has been described. However, a movie may automatically be created. The number of pages of a created photobook, the size of a display region, and the order of arrangement positions may correspond to the number of seconds of the time length of a generated movie, the number of display seconds of the movie, and the display order of the movie, respectively.

Second Embodiment

In the first embodiment, an example in which one important person group is selected out of extracted person groups based on the number of appearances in each event has been described. On the other hand, in this embodiment, an example in which the importance of a person group is calculated using the importance of each appearing person will be described.

Figure 14:
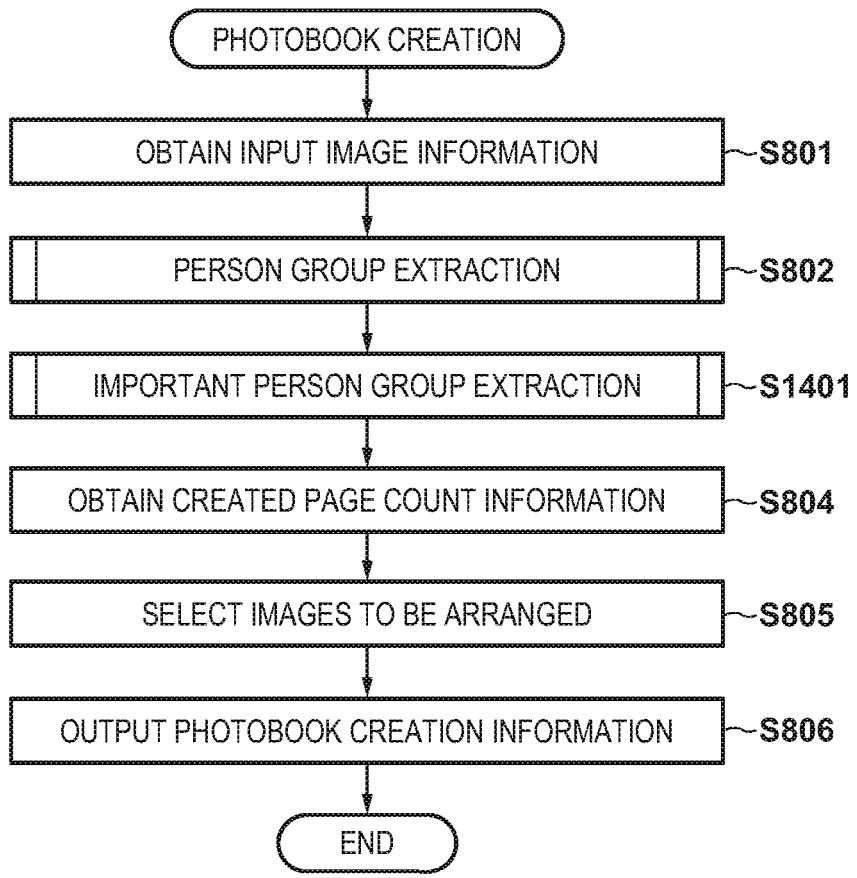
FIG. 14 is a flowchart showing photobook creation processing according to the second embodiment.

In this embodiment, the photobook creation flowchart of FIG. 8 according to the first embodiment is replaced with the flowchart of FIG. 14. The arrangement of an image processing apparatus 100 is the same as that in the first embodiment, and a description thereof will be omitted. Processing of calculating the importance of a person group according to this embodiment will be described below with reference to FIG. 14. Note that steps S801, S802, and S804 to S806 are the same as in the first embodiment, and a description thereof will be omitted.

Figure 15:
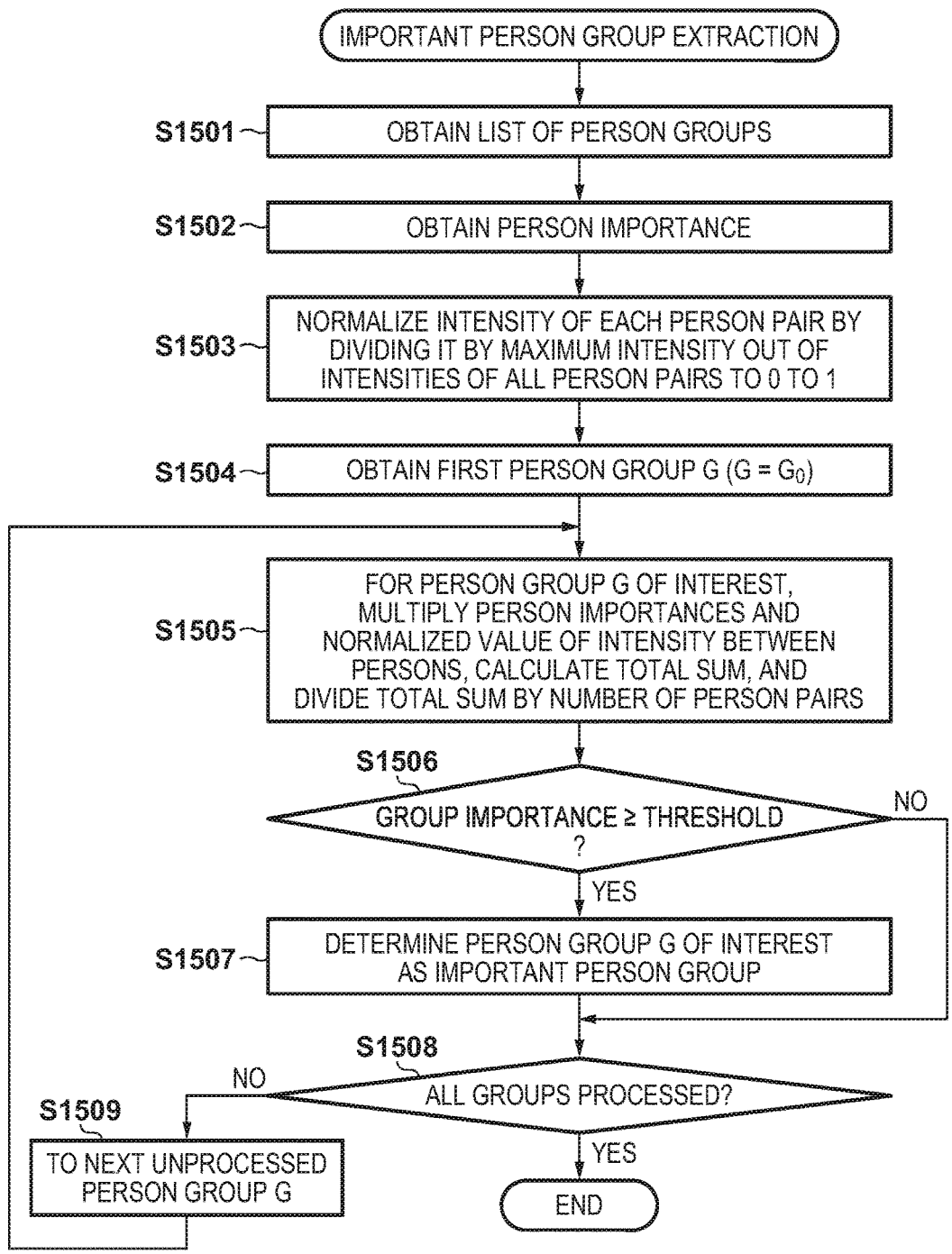
FIG. 15 is a flowchart showing important person group extraction processing according to the second embodiment.

In step S1401, a person group extraction unit 303 extracts an important person group from person groups extracted in step S802. The processing of extracting an important person group will be described with reference to the flowchart of FIG. 15.

In step S1501, the person group extraction unit 303 obtains a person group table 500 extracted in step S802.

In step S1502, the person group extraction unit 303 obtains a person importance table. FIG. 16 shows an example of a person importance table 1600 according to this embodiment. The person importance table 1600 includes a person ID 1601 and an importance 1602 of each person. In this embodiment, the importance of each person is calculated as a point within the range of 0 to 1. The greater the value is, the higher the importance is. The importance can be calculated based on the number of appearances of each person in images or given externally. As an example in which the importance is given externally, there is a method of recognizing a person by an imaging device and ranking the recognized person to set the importance of the person or a method of making the user to set the importance.

In step S1503, the person group extraction unit 303 normalizes the intensity of each person pair by dividing it by the intensity having the maximum value out of the intensities of all person pairs. The intensities are calculated using the values of a person relationship table 1003 (FIG. 10C)

obtained in step S912. FIG. 17 shows a person relationship table 1700 as an example obtained by calculating normalized intensities.

In step S1504, the person group extraction unit 303 extracts group IDs from the person group table 500, and obtains the total number of groups as n. The person groups are defined as $G_0, G_1, G_2, \ldots, G_{n-1}$ in the order of group ID. The person group extraction unit 303 sets the first person group $G_0$ as a person group G of interest.

In step S1505, the person group extraction unit 303 calculates the group importance of the person group G of interest. To calculate the group importance, the person importances of the persons of each person pair of the group and the intensity between the persons are multiplied, the products for all person pairs are added, and the result is divided by the total number of person pairs. For example, in a group including three persons, A, B, and C, let $I_a$ be the person importance of the person A, $I_b$ be the person importance of the person B, and $I_c$ be the person importance of the person C. Let $R_{ab}$ be the intensity between the persons A and B, $R_{ac}$ be the intensity between the persons A and C, and $R_{bc}$ be the intensity between the persons B and C. The score of group importance can be expressed as $$(I_a*I_b*R_{ab}+I_a*I_c*R_{ac}+I_b*I_c*R_{bc})/3$$

The extracted score of group importance is described in a group importance table 1800 shown in FIG. 18. The group importance table 1800 includes the items of a score 1801 and importance determination 1802 in addition to the items of the person group table 500 according to the first embodiment. The initial value is set to zero for both of the items of the score 1801 and the importance determination 1802.

In step S1506, the person group extraction unit 303 determines whether the score of group importance calculated in step S1505 is equal to or greater than a predetermined threshold. If the score is equal to or greater than the threshold (YES in step S1506), the process advances to step S1507. If the score is less than the threshold (NO in step S1506), the process advances to step S1508. Here, the threshold is a fixed value, and "0.2" is used in this example. However, the present invention is not limited to this, and the user may set an arbitrary value. Alternatively, the threshold may be changed depending on the calculated score of group importance. For example, the average of the scores of group importances is calculated, and a value larger than the average by a predetermined amount may be set as the threshold.

In step S1507, the person group extraction unit 303 determines a group whose score of group importance is equal to or greater than the threshold as an important person group, and sets "1" as the value of the importance determination 1802 in the group importance table 1800.

In step S1508, the person group extraction unit 303 determines whether the processes of steps S1505 to S1507 are ended for all person groups. If the processes are ended for all person groups (YES in step S1508), the processing procedure ends. If the processes are not ended for all person groups (NO in step S1508), the process advances to step S1509.

In step S1509, the person group extraction unit 303 changes the person group G of interest as the processing target to the next unprocessed person group. The process returns to step S1505 to repeat the processing.

As described above, in this embodiment, a person importance is used to calculate the importance of an extracted person group. In the first embodiment, one person group with the largest number of appearances in events is determined as being important. In this embodiment, a person group that has a few number of appearances in events, but includes an important person, can be determined to be an important person group. When a plurality of person groups are extracted, an important person group can be extracted without being mixed among less important groups by using the group importance. For example, a grandfather or a grandmother living in a faraway place appears only a few times, but can be included in an important person group by setting the person importance to be high.

It is, therefore, possible to use the information of an important person group when selecting image data from an event (image group) assigned to a spread (double spread) and to prevent image data including a less important person group from being selected. In addition, when assigning a plurality of events to one spread, the display region of an image of an important person group can be made greater than that for other person groups.

Third Embodiment

In the second embodiment, an example in which concerning selection of an extracted person group, the importance of the person group is calculated using the person importance in the group has been described. In this embodiment, however, an example in which subgroups having a stronger relationship are extracted from a person group, including many persons, will be described.

In this embodiment, the photobook creation flowchart of FIG. 14 according to the second embodiment is replaced with the flowchart of FIG. 19. The arrangement of an image processing apparatus 100 is the same as that in the first embodiment, and a description thereof will be omitted. A description of the same portions as in FIG. 14 will be omitted, and different portions will mainly be explained. Details of photobook creation processing according to this embodiment will be described below with reference to FIG. 19.

In step S1901, a person group extraction unit 303 obtains a person group table 500 extracted in step S802, and extracts subgroups from each person group. Processing of extracting subgroups will be described with reference to the flowchart of FIGS. 20A and 20B.

In step S2001, the person group extraction unit 303 obtains the person group table 500 extracted in step S802.

In step S2002, the person group extraction unit 303 extracts group IDs from the person group table 500, and obtains the total number of groups as n. The person groups are defined as $G_0, G_1, G_2, \ldots, G_{n-1}$ in the order of group ID. The person group extraction unit 303 sets the first person group $G_0$ as a person group G of interest.

In step S2003, the person group extraction unit 303 calculates the number of group members of the person group G of interest, and determines whether the number of group members is equal to or greater than the number of persons set as a threshold. If the number of group members is equal to or greater than the threshold (YES in step S2003), the process advances to step S2004. If the number of group members is less than the threshold (NO in step S2003), the process advances to step S2013. Here, the threshold is a fixed value, and "4" is used in this example. However, the present invention is not limited to this, and the user may set an arbitrary value.

In step S2004, the person group extraction unit 303 calculates the average value of intensities in the person group G of interest. More specifically, if the person group G of interest includes six persons, as shown in FIG. 21A, the number of person pairs can be calculated as 15 (6C2). In addition, the intensity of each pair of persons associated with the person group G is extracted by the method of step S912. FIG. 21B shows an example of intensities extracted here. Then, the average value of intensities in the person group G is calculated by dividing the total sum of the extracted intensities of the person pairs by the number of person pairs. In the example of FIG. 21B, the average value of intensities in the person group G is calculated as:

$$(70+50+48+24+26+34+30+46+52+42+14+14+16+16+38)/15=34.6.$$

In step S2005, the person group extraction unit 303 creates subgroups of all combinations from the person group G of interest. A case in which the person group G of interest includes six persons will be described in detail. In this case, fifteen subgroups of two persons, twenty subgroups of three persons, fifteen subgroups of four persons, and six subgroups of five persons are created. A total of fifty-six subgroups are created. FIG. 22 shows a subgroup table 2200 of the created subgroups. The subgroup table 2200 includes a subgroup ID 2201, a group member 2202 that describes person IDs, an intensity average value 2203, and an extraction target 2204. The subgroup tables 2200 are created as many as the number of person groups. The initial value is set to "0" for both the intensity average value 2203 and the extraction target 2204, and the values are sequentially updated by the following processing.

In step S2006, the person group extraction unit 303 extracts group IDs from the subgroup table 2200, and obtains the total number of groups as n. The subgroups are defined as $SG_0, SG_1, SG_2, \ldots, SG_{n-1}$ in the order of group ID. The person group extraction unit 303 sets the first subgroup $SG_0$ as a subgroup SG of interest.

In step S2007, the person group extraction unit 303 calculates the average value of intensities in the subgroup SG of interest. Calculation processing is performed by calculating the total sum of the intensities of all person pairs in the subgroup SG of interest and dividing the total sum by the number of person pairs, as in step S2004. For example, in SG_031-16 of the subgroup table 2200 shown in FIG. 22, the intensity (70) between F_100 and F_101, the intensity (50) between F_100 and F_110, and the intensity (34) between F_101 and F_110 are totaled (154) (see FIG. 21B), and the sum is divided by the number of person pairs (3), thereby calculating the average value of intensities as 51.3. The calculated average value is input to the intensity average value 2203 in the subgroup table 2200.

In step S2008, the person group extraction unit 303 determines whether the average value of intensities in the subgroup SG of interest calculated in step S2007 is greater than a predetermined multiple of the average value of intensities in the group G of interest calculated in step S2004. If the average value of intensities is greater than the predetermined multiple (YES in step S2008), the process advances to step S2009. Otherwise (NO in step S2008), the process advances to step S2010. That is, in this case, the subgroup SG of interest is not the extraction target. As the predetermined multiple, "1.5 times" is used in this example. However, the present invention is not limited to this, and the user may set an arbitrary value. Alternatively, not a multiple of the average value, but a fixed value may be used.

In step S2009, the person group extraction unit 303 sets the subgroup SG of interest to the extraction target. At this time, the person group extraction unit 303 inputs "1" to the extraction target 2204 of the subgroup set to the subgroup SG of interest in the subgroup table 2200.

In step S2010, the person group extraction unit 303 determines whether the processes of steps S2007 to S2009 are ended for all subgroups. If the processes are ended for all subgroups (YES in step S2010), the process advances to step S2012. If the processes are not ended for all subgroups (NO in step S2010), the process advances to step S2011.

In step S2011, the person group extraction unit 303 changes the subgroup SG of interest as the processing target to the next unprocessed subgroup. The process returns to step S2007 to repeat the processing.

In step S2012, the person group extraction unit 303 determines whether the processes of steps S2003 to S2010 are ended for all person groups. If the processes are ended for all person groups (YES in step S2012), the process advances to step S2014. If the processes are not ended for all person groups (NO in step S2012), the process advances to step S2013.

In step S2013, the person group extraction unit 303 changes the person group G of interest as the processing target to the next unprocessed person group. The process returns to step S2003 to repeat the processing.

In step S2014, the person group extraction unit 303 extracts subgroups determined as the extraction target from all the created subgroup tables 2200, and adds them to the person group table 500. The appearance event that is a short item when adding a subgroup to the person group table 500 is compensated for by extracting the event in which the subgroup appears using an image management table 400. The processing procedure thus ends.

As described above, in this embodiment, from a person group including many persons, subgroups of a small number of persons included the person group are created. Out of the created subgroups, a subgroup having an intensity higher than the intensity in the original person group is employed (extracted) as a new person group. Hence, if a person group includes six persons, for example, a bride and a bridegroom, the parents of the bride, and the parents of the bridegroom, the group of the bride and bridegroom having a stronger relationship (correlation) can be extracted.

Other Embodiments

Embodiment(s) of the present invention can also be realized by a computer of a system or an apparatus that reads out and executes computer executable instructions (e.g., one or more programs) recorded on a storage medium (which may also be referred to more fully as a non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   (A) one or more processors; and
   (B) a memory storing instructions which, when executed by the one or more processors, causes the image processing apparatus to function as:
   (a) a first obtaining unit configured to obtain a number of images in which a pair of a first person and a second person simultaneously appears, out of a plurality of images;
   (b) a detection unit configured to detect whether the pair appears in a target image group, which is one of a plurality of image groups into which the plurality of images is classified, wherein, in determining whether the pair appears in the target image group, it is determined that the pair appears in the target image group (i) in a case when the target image group includes an image in which the first person and the second person simultaneously appear, and (ii) in a case when the target image group includes images in which the first person and the second person respectively appear separately;
   (c) a second obtaining unit configured to obtain a number of image groups in which the pair appears, by (i) changing an image group of the plurality of image groups to the target image group and (ii) repeating the determination by the detection unit of whether the pair appears in the target image group;
   (d) a specifying unit configured to specify an intensity of a relationship between the first person and the second person based on the number of images obtained by the first obtaining unit and the number of image groups obtained by the second obtaining unit;
   (e) a generation unit configured to generate information of a correlation of a plurality of persons who appear in the plurality of images, based on the intensity specified by the specifying unit;
   (f) an extraction unit configured to extract one or a plurality of person groups to which each of the plurality of persons belongs, based on the information of the correlation of the persons generated by the generation unit, and to produce an extraction result based on the extracted one or a plurality of person groups;
   (g) an image selection unit configured to receive the extraction result and to automatically select images based on the information of the extracted one or a plurality of person groups; and
   (h) an image arrangement unit configured (i) to arrange the images selected by the image selection unit, and (ii) to cause a display screen to display the arranged images.

2. The apparatus according to claim 1, wherein the plurality of images are classified into the plurality of image groups based on at least one of capturing information and attribute information.

3. The apparatus according to claim 1, wherein the image selection unit is configured to select a person group including a person who appears in a maximum number of image groups as an important person group out of the plurality of person groups extracted by the extraction unit.

4. The apparatus according to claim 1, wherein the image selection unit is configured to specify an importance of each of the plurality of person groups extracted by the extraction unit and to select a person group having an importance greater than a predetermined threshold, as an important person group.

5. The apparatus according to claim 4, wherein the image selection unit further specifies the importance of the person group using the intensity of the relationship between the persons included in the person group and the importance of each person.

6. The apparatus according to claim 5, wherein the specifying unit further specifies the importance of the person based on the number of appearances of the person in the images.

7. The apparatus according to claim 1, further comprising a dividing unit configured, if the number of persons belonging to the person group extracted by the extraction unit is greater than a predetermined threshold, to divide the person group based on the intensity of the relationship between the persons belonging to the person group and to generate a new group.

8. A method of controlling an image processing apparatus, the method comprising the following steps:
   obtaining a number of images in which a pair of a first person and a second person simultaneously appears, out of a plurality of images;
   detecting whether the pair appears in a target image group, which is one of a plurality of image groups into which the plurality of images is classified, wherein, in determining whether the pair appears in the target image group, it is determined that the pair appears in the target image group (i) in a case when the target image group includes an image in which the first person and the second person simultaneously appear, and (ii) in a case when the target image group includes images in which the first person and the second person respectively appear separately;
   obtaining a number of image groups in which the pair appears, by (i) changing an image group of the plurality of image groups to the target image group and (ii) repeating the determination in the detecting step of whether the pair appears in the target image group;
   specifying an intensity of a relationship between the first person and the second person based on the number of images (i) obtained in the obtaining the number of images and (ii) the number of image groups obtained in the obtaining the number of image groups;
   generating information of a correlation of a plurality of persons who appear in the plurality of images, based on the intensity specified in the specifying step;
   extracting one or a plurality of person groups to which each of the plurality of persons belongs, based on the information of the correlation of the persons generated in the generating step, and producing an extraction result based on the extracted one or a plurality of person groups;
   automatically selecting images based on the information of the extracted one or a plurality of person groups;
   arranging the images selected in the selecting step; and
   causing a display screen to display the arranged images.

9. A non-transitory computer-readable storage medium storing a program that causes a computer to function as:

a first obtaining unit configured to obtain a number of images in which a pair of a first person and a second person simultaneously appears, out of a plurality of images;

a detection unit configured to detect whether the pair appears in a target image group which is one of a plurality of image groups into which the plurality of images is classified, wherein, in determining whether the pair appears in the target image group, it is determined that the pair appears in the target image group (i) in a case when the target image group includes an image in which the first person and the second person simultaneously appear, and (ii) in a case when the target image group includes images in which the first person and the second person respectively appear separately;

a second obtaining unit configured to obtain a number of image groups in which the pair appears, by (i) changing an image group of the plurality of image groups to the target image group and (ii) repeating the determination by the detection unit of whether the pair appears in the target image group;

a specifying unit configured to specify an intensity of a relationship between the first person and the second person based on the number of images obtained by the first obtaining unit and the number of image groups obtained by the second obtaining unit;

a generation unit configured to generate information of a correlation of a plurality of persons who appear in the plurality of images, based on the intensity specified by the specifying unit;

an extraction unit configured to extract one or a plurality of person groups to which each of the plurality of persons belongs, based on the information of the correlation of the persons generated by the generation unit, and to produce an extraction result based on the extracted one or a plurality of person groups;

an image selection unit configured to receive the extraction result and to automatically select images based on the information of the extracted one or a plurality of person groups; and an image arrangement unit configured (i) to arrange the images selected by the image selection unit, and (ii) to cause a display screen to display the arranged images.

10. The method according to claim 8, wherein the plurality of images are classified into the plurality of image groups based on at least one of capturing information and attribute information.

11. The method according to claim 8, wherein the selecting step selects a person group including a person who appears in a maximum number of image groups as an important person group out of the plurality of person groups extracted in the extraction step.

12. The method according to claim 8, wherein the selecting step specifies an importance of each of the plurality of person groups extracted by in the extraction step and selecting a person group having an importance larger than a predetermined threshold as an important person group.

13. The method according to claim 12, wherein the selecting step further specifies the importance of the person group using the intensity of the relationship between the persons included in the person group and the importance of each person.

14. The method according to claim 13, wherein the specifying step further specifies the importance of the person based on the number of appearances of the person in the images.

15. The method according to claim 8, further comprising a dividing step, if the number of persons belonging to the person group extracted by in the extraction step is greater than a predetermined threshold, to divide the person group based on the intensity of the relationship between the persons belonging to the person group and to generate a new group.

16. The non-transitory computer-readable medium according to claim 9, wherein the plurality of images are classified into the plurality of image groups based on at least one of capturing information and attribute information.

17. The non-transitory computer-readable medium according to claim 9, wherein the image selection unit selects a person group including a person who appears in a maximum number of image groups as an important person group out of the plurality of person groups extracted in the extraction step.

18. The non-transitory computer-readable medium according to claim 9, wherein the image selection unit specifies an importance of each of the plurality of person groups extracted by in the extraction step and selecting a person group having an importance greater than a predetermined threshold as an important person group.

19. The non-transitory computer-readable medium according to claim 18, wherein the image selection unit further specifies the importance of the person group using the intensity of the relationship between the persons included in the person group and the importance of each person.

20. The non-transitory computer-readable medium according to claim 19, wherein the specifying unit further specifies the importance of the person based on the number of appearances of the person in the images.

21. The non-transitory computer-readable medium according to claim 9, further comprising a dividing unit, if the number of persons belonging to the person group extracted by in the extraction step is greater than a predetermined threshold, to divide the person group based on the intensity of the relationship between the persons belonging to the person group and to generate a new group.

22. A method of controlling an image processing apparatus, the method comprising the following steps:

obtaining a number of images in which a pair of a first person and a second person simultaneously appears, out of a plurality of images;

detecting whether the pair appears in a target image group, which is one of a plurality of image groups into which the plurality of images is classified, wherein, in determining whether the pair appears in the target image group, it is determined that the pair appears in the target image group (i) in a case when the target image group includes an image in which the first person and the second person simultaneously appear, and (ii) in a case when the target image group includes images in which the first person and the second person respectively appear separately;

obtaining a number of image groups in which the pair appears, by (i) changing an image group of the plurality of image groups to the target image group and (ii) repeating the determination in the detecting step of whether the pair appears in the target image group;

specifying an intensity of a relationship between the first person and the second person based on the number of images (i) obtained in the obtaining the number of images and (ii) the number of image groups obtained in the obtaining the number of image groups;

generating information of a correlation of a plurality of persons who appear in the plurality of images, based on the intensity specified in the specifying step;

extracting one or a plurality of person groups to which each of the plurality of persons belongs, based on the information of the correlation of the persons generated in the generating step, and producing an extraction result based on the extracted one or a plurality of person groups;

automatically selecting images based on the information of the extracted one or a plurality of person groups;

arranging the images selected in the selecting step; and causing output of the arranged images for creation of a photobook.

23. The method according to claim 22, wherein the plurality of images are classified into the plurality of image groups based on at least one of capturing information and attribute information.

24. The method according to claim 22, wherein the selecting step selects a person group including a person who appears in a maximum number of image groups as an important person group out of the plurality of person groups extracted in the extraction step.

25. The method according to claim 22, wherein the selecting step specifies an importance of each of the plurality of person groups extracted by in the extraction step and selecting a person group having an importance larger than a predetermined threshold as an important person group.

26. The method according to claim 25, wherein the selecting step further specifies the importance of the person group using the intensity of the relationship between the persons included in the person group and the importance of each person.

27. The method according to claim 26, wherein the specifying step further specifies the importance of the person based on the number of appearances of the person in the images.

28. The method according to claim 22, further comprising a dividing step, if the number of persons belonging to the person group extracted by in the extraction step is greater than a predetermined threshold, to divide the person group based on the intensity of the relationship between the persons belonging to the person group and to generate a new group.

* * * * *